Figure 1:
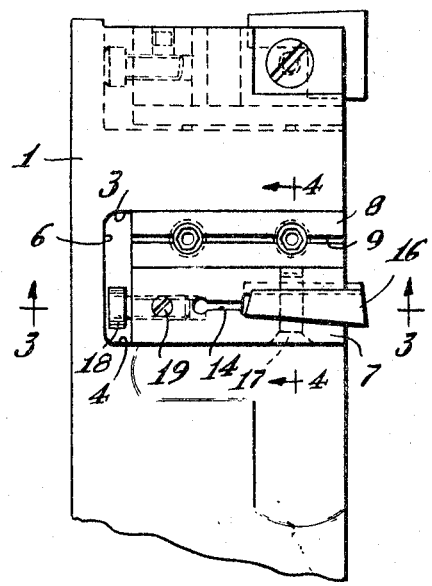

Sept. 6, 1966     T. V. WILLIAMS     3,270,396
BIT HOLDER

Filed Feb. 25, 1965     3 Sheets-Sheet 1

Inventor
Thurston V. Williams
By Roberts, Cushman + Grover
ATT'YS

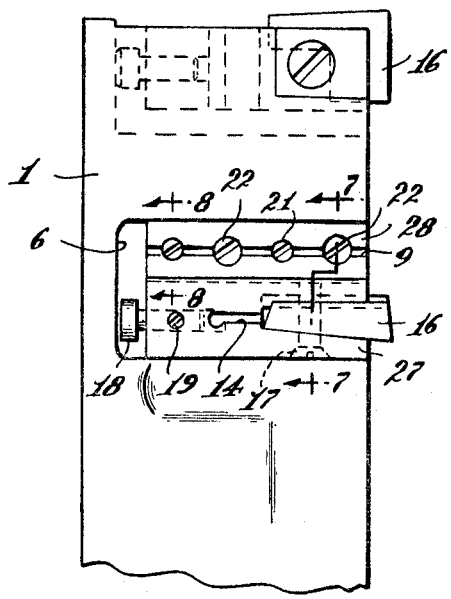
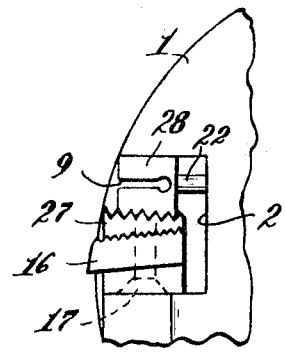
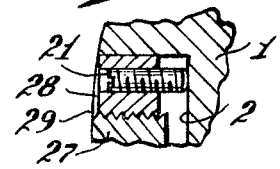
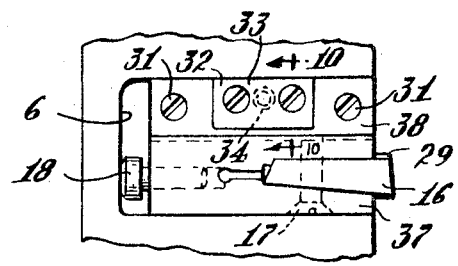
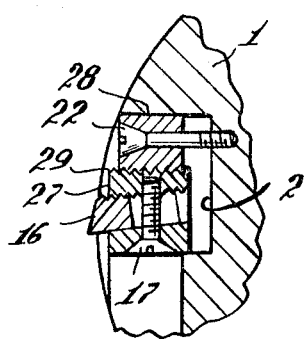
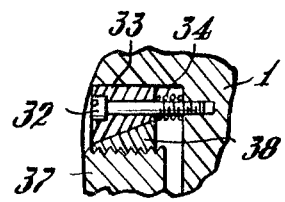

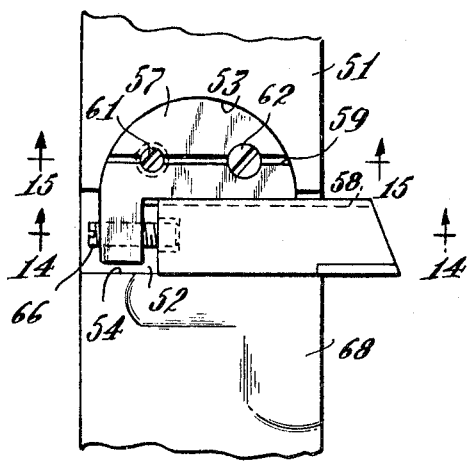
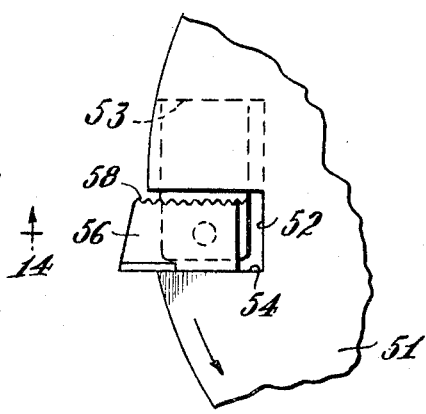
Fig. 12    Fig. 13
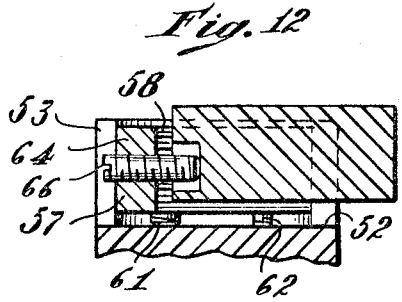
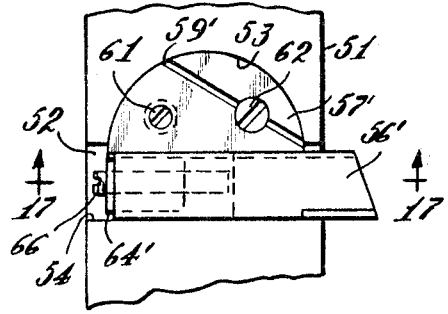
Fig. 14    Fig. 16
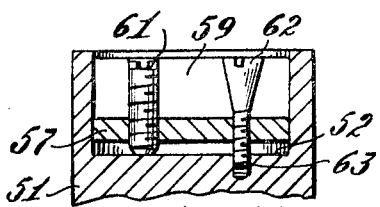
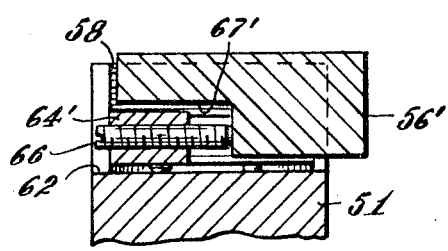
Fig. 15    Fig. 17
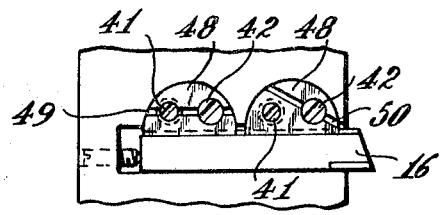
Fig. 11

United States Patent Office 3,270,396
Patented Sept. 6, 1966

3,270,396
BIT HOLDER
Thurston V. Williams, Wilton, N.H., assignor to The O.K. Tool Company, Inc., Milford, N.H., a corporation of New Hampshire
Filed Feb. 25, 1965, Ser. No. 435,278
2 Claims. (Cl. 29—105)

This application is a continuation-in-part of applications Ser. No. 198,823, filed May 31, 1962, now abandoned, Ser. No. 238,942, filed Nov. 20, 1962, and Ser. No. 308,481, filed Sept. 12, 1963.

While this invention is particularly applicable to end-facing tools, it is also useful in other tools such as milling cutters, lathes, etc.

Objects of the invention are to provide a bit locator which is simple and economical in construction, which will fit existing tools having recesses to receive holders of the bit-and-claimp type, which can be mounted and adjusted from one side of a tool, which affords micrometer adjustment of a bit in each of two directions, which can be adjusted and clamped quickly and easily, and which is durable and reliable in use.

In one aspect the present invention comprises a bit locator for use in tools provided with a bit recess having a bottom and two sides such as the well-known milling head having a series of such recesses around its periphery. The locator may be sold with a milling head or other carrier, or it may be sold separately for use in existing tools having the usual recesses. The locator has a shoulder facing away from said bottom to prevent movement of the bit toward said bottom, a screw threaded through said locator and seating on said bottom to adjust the position of the locator relatively to said bottom, the locator including a wedge to lock the bit in the recess, and a second screw in the locator for actuating the wedge. The aforesaid shoulder may extend at right angles to the locator or it may be sloping as a serration. The locator may have a bifurcation so that it can be expanded relatively to the aforesaid sides and the wedge may comprise a tapered head on the second screw for spreading the bifurcation. Preferably the second screw extends through the locator and threads into the aforesaid bottom for interconnecting the locator with the carrier.

In another aspect the invention involves a rotary head or other carrier movable in a predetermined direction, the carrier having a recess defined by a bottom and two sides, one side facing in the aforesaid direction and the other side facing in the opposite direction and, in the aforesaid recess, a bit holder bearing on one of said sides and a locator bearing on the other of said sides, said holder and locator having abutting surfaces to prevent movement of the holder relatively to the locator toward said bottom, a screw extending through the locator into engagement with said bottom to adjust the holder and locator relatively to said bottom and means for locking the locator in adjusted position. Preferably the holder has a bifurcation in one end dividing it into two sections with a bit recess therebetween, and means for forcing said sections together to clamp a bit therebetween. Said last means may comprise a screw extending through one section and threading into the other osection. Preferably the means for locking the locator in adjusted position comprises a screw extending through the locator and threading into the aforesaid carrier. The aforesaid locking means preferably comprises a wedge for clamping the locator against the holder. The locator may have a bifurcation and the aforesaid locking means may comprise a tapered screw for spreading the bifurcation. The adjusting and locking screws may be coaxial or they may be offset relatively to each other lengthwise of the recess.

In a more specific aspect the tool comprises a carrier movable in a predetermined direction, the carrier having a recess defined by a bottom, end and two sides, one side facing in said direction and the other side facing in the opposite direction, in the recess a bit holder bearing on one of the sides and a locator bearing on the other of the sides, the holder and locator having abutting surfaces to prevent movement of the holder relatively to the locator toward the bottom, a screw extending through the locator into engagement with the bottom to afford a micrometer adjustment of the holder and locator relatively to the bottom, a screw bridging the space between the aforesaid end and the opposing end of the holder, the screw being threaded into one of the ends and bearing on the other end to afford a micrometer adjustment of the holder relatively to the first end, and means for locking the locator in adjusted position.

In the preferred embodiment the abutting sides of the locator and recess are cylindrical and the tool has means for adjusting the bit parallel to the aforesaid bottom. The adjusting means comprises a screw threaded in the carrier or locator and bearing on the rear end of the bit. Preferably the locator has a lug extending across the aforesaid recess behind the rear end of the bit and said last screw threads through the lug.

Figure 2:
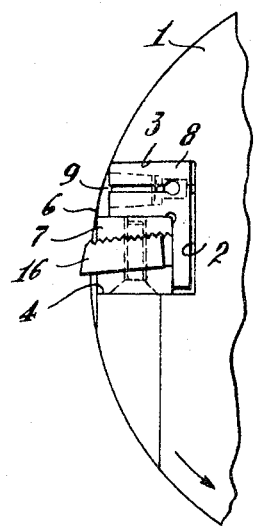
Figure 3:
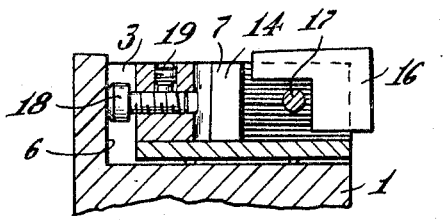
Figure 4:
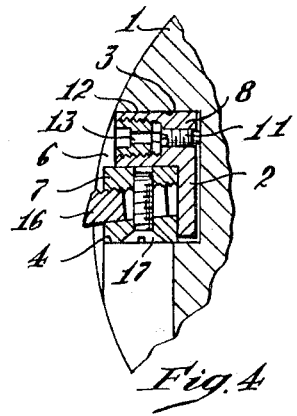

For the purpose of illustration typical embodiments of the invention are shown in the accompanying drawings in which
  FIG. 1 is a side elevation;
  FIG. 2 is an end elevation;
  FIG. 3 is a section on line 3—3 of FIG. 1;
  FIG. 4 is a section on line 4—4 of FIG. 1;
  FIG. 5 is a view like FIG. 1 showing a modification;
  FIG. 6 is a view like FIG. 2 showing the same modification;
  FIG. 7 is a section on line 7—7 of FIG. 5;
  FIG. 8 is a section on line 8—8 of FIG. 5;
  FIG. 9 is a view like FIG. 1 showing another modification;
  FIG. 10 is a section on line 10—10 of FIG. 9;
  FIG. 11 is a view like FIG. 9 showing another modification;
  FIG. 12 is a side elevation of another embodiment;
  FIG. 13 is an end elevation of the same embodiment;
  FIG. 14 is a section on line 14—14 of FIG. 12;
  FIG. 15 is a section on line 15—15 of FIG. 12;
  FIG. 16 is a view like FIG. 12 showing a modification; and
  FIG. 17 is a section on line 17—17 of FIG. 16.

The particular embodiment of the invention shown in FIGS. 1 to 4 comprises a rotating carrier 1 turning in the direction of the arrow in FIG. 2. Distributed around the periphery of the carrier is a series of recesses each having a bottom 2, a side 3 facing in the direction of rotation, a side 4 facing in the opposite direction and an end 6. Disposed in each recess is a bit holder 7 and an L-shaped locator 8, the base of the locator facing the bottom of the recess and the upright of the locator extending along the aforesaid side 3. The upright has a longitudinal slot 9 extending from its outer end toward the bottom of the recess. Extending from the bottom of the slot through the bottom of he locator are threaded bores to receive screws 11. In its outer end the locator has larger bores in alignment with the aforesaid bores to receive screws 12. Extending through each screw 12 is an axial opening 13 through which a screwdriver may be inserted to turn the screw 11, the outer end of this opening being shaped to receive an Allen wrench.

The bit holder 7 has a bifurcation 14 dividing it into two sections with a recess therebetween to receive an L-shaped bit 16 (FIG. 3). A screw 17 extends through one of the aforesaid sections and threads into the other section for drawing the two sections together to clamp the bit in place. As shown in the drawing one side of the bit and one of the aforesaid sections may have serrations extending axially of the carrier to interlock the bit and holder. Threaded into the inner end of the bit holder is a screw 18 bearing on the aforesaid end 6 of the recess, the screw being locked in position by a set screw 19.

In operation the bit is clamped in the holder 7 with the screw 17 and the parts are placed in the recess. The extent to which the bit projects from the end of the carrier is adjusted with the screw 18. The extent to which the bit projects radially is adjusted by means of the screws 11. Then the screws 12 are tightened to clamp the parts in adjusted position.

The embodiment shown in FIGS. 5 to 8 is similar to that shown in FIGS. 1 to 4 and corresponding parts are correspondingly numbered. However, instead of the L-shaped locator 8, the holder 27 is interlocked with the locator 28 by means of serrations 29. In lieu of the coaxial adjusting screws 11 and clamping screws 13, the adjusting screws 21 and clamping screws 22 are offset lengthwise of the bifurcation 9. Moreover the adjusting screws 21 thread into the carrier 1 so as to hold the locator and holder in adjusted position positively.

The modification shown in FIGS. 9 and 10 is similar to that shown in FIGS. 5 to 8 except in that the clamping screws 22 are replaced by clamping screws 32 actuating a wedge 33 bearing on an inclined surface of the locator 38. A spring 34 may be provided to urge the wedge 33 outwardly when the screw 32 is retracted.

The modification shown in FIG. 11 is like that shown in FIGS. 5 to 8 except that the locator 28 is replaced by two locators 48 which are semi-cylindrical. They are adjustable toward and from the bottom of the recess of the carrier 1 by means of screws 41 corresponding to 21 of FIGS. 5 to 8 and they are locked in adjusted position by means of screws 42 corresponding to screws 22 in FIGS. 5 to 8. The bifurcation in the locator may extend lengthwise of the bit recess as shown at 49 or it may extend obliquely as shown at 50. As shown in FIG. 11 the bit holder, 7 in FIGS. 1 to 4, 27 in FIGS. 5 to 8 and 37 in FIGS. 9 and 10, may be eliminated and the locators may bear directly on the bit 16. Thus the means carrying the cutting edge may comprise a bit and holder as in FIGS. 1 to 10 or only a bit as in FIG. 11.

The particular embodiment of the invention shown in FIGS. 12 to 15 comprises a rotary carrier 51 turning in the direction of the arrow in FIG. 13. Distributed around the periphery of the carrier is a series of recesses each having a bottom 52, a semi-cylindrical side 53 facing in the direction of rotation and a flat side 54 facing in the opposite direction. Disposed in each recess is a bit 56 bearing on the flat side 54 of the recess and a semi-cylindrical locator 57 bearing on the semi-cylindrical side 53 of the recess. The abutting faces of the bit and locator have serrations 58 extending lengthwise of the bit to provide shoulders facing away from the bottom of the recess to prevent movement of the bit toward the bottom. The locator has a bifurcation in the form of a groove 59 extending inwardly from the outer end of the locator toward the inner end. Threaded through the locator is a screw 61 which seats on the bottom of the recess to adjust the position of the bit relatively to the bottom of the recess. Another screw 62 threads through the locator and thence into a threaded bore 63 in the bottom of the recess. The outer end of the screw is tapered as shown in FIG. 15, thereby serving as a wedge to expand the bifurcated locator and lock the bit in adjusted position.

Extending across the recess behind the rear end of the bit is a lug 64 and threading through the lug is a screw 66 which seats in the bottom of a recess 67 in the rear end of the bit, the screw serving to adjust the extent to which the bit 56 projects beyond the face 68 of the carrier 51.

In mounting a bit in the carrier recess the serrations 58 are interengaged and the bit and locator are slipped into the carrier recess as a unit. The screw 61 is turned to adjust the extent to which the bit 56 projects beyond the periphery of the carrier, and the screw 66 is turned to adjust the extent to which the bit projects beyond the face 68. Then the screw 62 is threaded inwardly to lock the bit and locator in adjusted position.

The modification shown in FIGS. 16 and 17 is similar to that shown in FIGS. 12 to 15 and corresponding parts are correspondingly designated. However the bifurcation 59' extends obliquely to the bit instead of parallel. Also the lug 64 on the locator is recessed on its upper side so as to extend under the rear end of the bit 56' and the recess 67' in the bit is on the lower side of the bit to accommodate the lug 64'.

As shown in FIGS. 1 to 10 the interengaging faces of the bit and holder may be serrated to provide shoulders to hold the bit in place, and in FIGS. 11 to 17 the bit 16 and locators 48 are serrated to provide such shoulders.

It should be understood that the present disclosure is for the purpose of illustration only and that this invention includes all modifications and equivalents which fall within the scope of the appended claims.

I claim:

1. A tool comprising a carrier part movable in a predetermined direction, the carrier having a recess defined by a bottom and two sides, one side facing in said direction and the other side facing in the opposite direction, in said recess a bit bearing on one of said sides and a locator part bearing on the other of said sides, said bit and locator part having abutting surfaces to prevent movement of the bit relatively to the locator toward said bottom, a screw extending through the locator into engagement with said bottom to adjust the bit and locator relatively to said bottom, means for locking the locator in adjusted position, and means for adjusting said bit parallel to said bottom, said means including a screw threaded in one of said parts and bearing on the rear end of the bit.

2. A tool according to claim 1 wherein the locator has a lug extending across said recess behind said rear end of the bit and said last screw threads through said lug.

No references cited.

WILLIAM W. DYER, Jr., *Primary Examiner.*

H. L. HINSON, *Assistant Examiner.*